(12) United States Patent
Perez et al.

(10) Patent No.: US 12,551,308 B2
(45) Date of Patent: Feb. 17, 2026

(54) SYSTEMS AND METHODS FOR DRAPING A MEDICAL DEVICE

(71) Applicant: Stryker Corporation, Kalamazoo, MI (US)

(72) Inventors: Pedro A. Perez, Hollister, CA (US); Jared Coffeen, Hollister, CA (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 17/808,534

(22) Filed: Jun. 23, 2022

(65) Prior Publication Data

US 2022/0409318 A1      Dec. 29, 2022

Related U.S. Application Data

(60) Provisional application No. 63/214,552, filed on Jun. 24, 2021.

(51) Int. Cl.
*A61B 46/00*     (2016.01)
*A61B 46/17*     (2016.01)
*A61B 46/20*     (2016.01)

(52) U.S. Cl.
CPC .............. *A61B 46/17* (2016.02); *A61B 46/40* (2016.02); *A61B 2046/205* (2016.02)

(58) Field of Classification Search
CPC ......... A61B 46/10; A61B 46/17; A61B 46/23; A61B 46/40; A61B 2046/205; A61B 2046/234; A61B 46/27; A61B 1/00135
See application file for complete search history.

(56) References Cited

U.S. PATENT DOCUMENTS

| | | | | |
|---|---|---|---|---|
| 5,122,904 | A * | 6/1992 | Fujiwara | A61B 90/25 206/316.1 |
| 5,274,500 | A * | 12/1993 | Dunn | A61B 1/042 359/507 |
| 5,765,565 | A * | 6/1998 | Adair | H04N 5/64 128/849 |
| 5,970,980 | A | 10/1999 | Adair | |
| 6,805,453 | B2 * | 10/2004 | Spetzler | A61B 46/10 359/511 |
| 6,942,650 | B1 * | 9/2005 | Schultz | B01D 46/24 604/315 |
| 7,699,855 | B2 | 4/2010 | Anderson et al. | |
| 12,193,779 | B2 * | 1/2025 | Yamane | A61B 46/10 |

(Continued)

OTHER PUBLICATIONS

International Search Report and Written Opinion mailed Oct. 25, 2022, directed to International Application No. PCT/US2022/073123; 12 pages.

(Continued)

*Primary Examiner* — Camtu T Nguyen
(74) *Attorney, Agent, or Firm* — Morrison & Foerster LLP (57) ABSTRACT

A drape for a medical device, the drape including a flexible drape material for covering at least a portion of a medical device and configured to be cinched in at least one location to form an enclosed space for enclosing the at least a portion of the medical device, and a vacuum manifold that, when the flexible drape material is cinched, is positioned at least partially within the enclosed space for creating a vacuum in the enclosed space to cause the flexible drape material to conform to the at least a portion of the medical device when the at least a portion of the medical device is positioned within the enclosed space.

25 Claims, 11 Drawing Sheets

(56) References Cited

U.S. PATENT DOCUMENTS

2005/0004943 A1* 1/2005 Chang ................ G06F 16/9538
2005/0143625 A1 6/2005 Whitmore et al.
2019/0246873 A1* 8/2019 Lu .......................... A61B 1/307

OTHER PUBLICATIONS

International Preliminary Report on Patentability dated Jan. 4, 2024, directed to International Patent Application No. PCT/US2022/073123; 9 pages.

* cited by examiner

SYSTEMS AND METHODS FOR DRAPING A MEDICAL DEVICE

CROSS-REFERENCE TO RELATED APPLICATIONS

This application claims the benefit of U.S. Provisional Application No. 63/214,552, filed Jun. 24, 2021, the entire contents of which are hereby incorporated by reference herein.

FIELD

This present disclosure is related generally to medical devices, and more specifically, to draping medical devices.

BACKGROUND

Surgical procedures pose a risk of infection to the patient. To mitigate infection risks, a sterile field is maintained around the surgical site. Surgical procedures involve the use of surgical devices or other types of medical devices that are used within the sterile field. Sterility of these medical devices must be maintained to ensure that the surgical field remains sterile. Some medical devices, such as scalpels, forceps, and other similar tools, may be sterilized after each use. Sterilization takes some time, so several sets of sterilized some medical devices may be kept on hand to reduce the delay between medical procedures.

Some medical devices that are used in a sterile field may not be sterilizable. For example, some imaging system components, such as some endoscopic camera heads, may not be sterilizable due to the risk of damage to sensitive components during sterilization. Even for camera heads that are sterilizable, it may be costly or impractical to have multiple sterilized camera heads on hand for use in back-to-back medical procedures. Additionally, repeated sterilizations may reduce the lifespan of a complex medical device, such as a camera head.

Medical devices that are not sterilized can still be used within a surgical field by covering the devices in sterile drapes. Once a medical device has been covered by a drape, one or more cinches may be cinched around the drape to hold the drape to the medical device. Drapes are often larger than the medical device that they are designed to cover, which ensures that the drapes can be easily positioned over the medical device. However, the excess material may make grasping of the medical device or other interaction with the medical device difficult.

SUMMARY

According to an aspect, a medical device draping system includes a drape for covering a medical device and a vacuum manifold positioned within the enclosed space created by the drape for drawing a vacuum that causes the drape to conform to the medical device. The vacuum manifold includes a plurality of air flow inlets that are arranged to ensure that at least some of the air flow inlets remain open when the drape conforms to the medical device and vacuum manifold. The vacuum manifold may be elongate and the air flow inlets extending along and around at least a portion of the vacuum manifold and around.

A drape for a medical device may include a flexible drape material for covering at least a portion of a medical device and configured to be cinched in at least one location to form an enclosed space for enclosing the at least a portion of the medical device; and a vacuum manifold that, when the flexible drape material is cinched, is positioned at least partially within the enclosed space for creating a vacuum in the enclosed space to cause the flexible drape material to conform to the at least a portion of the medical device when the at least a portion of the medical device is positioned within the enclosed space.

Optionally, the drape includes an adapter for mounting to the medical device.

Optionally, the drape includes at least one cinch for cinching the flexible drape material.

Optionally, the at least one cinch includes an elastic band, a tie, or tape.

Optionally, the cinch is configured for cinching the flexible drape material to one or more cables extending from the medical device Optionally, when the flexible drape material is cinched and the vacuum manifold is positioned within the enclosed space, the flexible drape material is cinched around the vacuum manifold.

Optionally, the drape includes a distal portion attached to the distal end of the flexible drape material and the distal portion comprises a port through which the vacuum manifold extends.

Optionally, the port is mounted on the flexible drape material.

Optionally, the vacuum manifold includes a perforated outer surface.

Optionally, the vacuum manifold includes a porous flexible material.

Optionally, the vacuum manifold is sterilizable and reusable.

Optionally, the drape includes a lens.

According to various aspects, a method of draping a medical device includes positioning a flexible drape material over at least a portion of the medical device, cinching the flexible drape material to form an enclosed space within which the at least a portion of the medical device is positioned, and applying a vacuum to the enclosed space via a vacuum manifold that is positioned at least partially within the enclosed space so that the flexible drape material conforms to the at least a portion of the medical device.

Optionally, the flexible drape material is cinched around one or more cables extending from the medical device.

Optionally, the vacuum manifold is elongate and a length of the vacuum manifold extends in a longitudinal direction of the one or more cables.

Optionally, the method includes, prior to positioning a flexible drape material over at least a portion of the medical device, mounting an adapter portion of the drape to the medical device.

Optionally, the medical device includes a user interface and the flexible drape material conforms to the user interface.

Optionally, the vacuum manifold includes a plurality of perforations.

Optionally, the method includes, after positioning the flexible drape material over the at least a portion of the medical device and preferably prior to cinching the flexible drape material, inserting the vacuum manifold. The flexible drape material can be cinched around the vacuum manifold.

Optionally, the vacuum manifold is inserted through a port in a distal portion of the drape.

Optionally, the vacuum manifold is mounted to the flexible drape material.

Optionally, the medical device is a camera.

Optionally, the drape includes a lens for positioning in front of an imaging port of the camera.

Optionally, the medical device is an endoscopic camera or an open-field camera.

Optionally, the method further includes positioning a sealing material where the flexible drape material is cinched.

BRIEF DESCRIPTION OF THE FIGURES

The invention will now be described, by way of example only, with reference to the accompanying drawings, in which.

DETAILED DESCRIPTION

Systems and methods may include draping a medical device and applying vacuum to the space enclosed by the drape so that the drape conforms to the medical device and including within the enclosed space a vacuum manifold through which the vacuum is applied. The vacuum can e.g. be applied by a pump system providing subatmospheric pressure and/or displacing air out of the enclosed space. The vacuum manifold is configured to prevent the drape from blocking vacuum air flow. Thus, the user can ensure that vacuum is applied to the entire enclosed area, ensuring that the drape consistently conforms to the medical device.

The systems and methods can cause the drape to wrap tightly around the medical device, reducing slippage between the medical device and drape and providing better access to any user interface(s) that the medical device may have. The systems and methods can enable the use of unsterilized medical devices, such as cameras and microscopes, for minimally invasive surgery, open surgery, or other surgeries or other medical procedures requiring a sterile field. This can decrease the medical device reprocessing cycle time and increase the medical device's availability and usage, with minimal negative impact to usability of the medical device.

The systems and methods are an improvement over conventional drapes, in particular for camera heads. With conventional drapes, users often must manipulate the drape to access different portions of the camera head, such as buttons used for controlling the camera head. Additionally, excess drape material can obstruct the imaging pathway of the camera head. In contrast, the draping systems and methods according to the principles described herein can tightly wrap the drape around the camera head, exposing the camera buttons and preventing the blockage of the imaging pathway. Additionally, the systems and methods can reduce the volume of the surgical site occupied by the drape.

The vacuum manifold may include a plurality of inlets for air to flow into the manifold when vacuum is applied to the manifold. The manifold is configured so that the drape is unlikely to completely block all of the inlets. This ensures that at least some of the inlets are open to air flow so that vacuum can be applied consistently to the entire space enclosed by the drape, ensuring that the drape conforms to the medical device. The manifold may extend alongside cables and/or other lines that extend from the medical device (such as power cables, light cables, or other service lines), which can ensure that the drape does not block all of the inlets when vacuum is applied via the manifold. The manifold may be elongate and the plurality of inlets may extend along at least a portion of the manifold in the longitudinal direction of the manifold. The plurality of inlets may extend circumferentially around substantially the entire circumference of at least a portion of the manifold, which helps prevent all of the inlets from being blocked by the drape when vacuum is applied.

A port can be provided in the drape for attaching a vacuum line. The port can be built into the manifold or can be a separate piece to which the manifold attaches. The manifold may be integrated with the drape. The manifold may be separate from the drape and extend out of the enclosed space through the distal opening in the drape—e.g., the opening through which cables or other lines from the medical device extend. The drape may include an opening through which the manifold extends. The drape system may include a cinching component, such as a strap, that is cinched around the manifold and cables and/or other service lines to create a seal (e.g., a sufficient seal for the available vacuum flow rate) such that the medical device, cables and/or other service lines, and manifold are positioned within the enclosed space formed by cinching the open end of the drape around the manifold and cables and/or other service lines.

The manifold may comprise a rigid tubular body that includes the plurality of inlets formed in the outer wall of the body, such as machined or molded into the outer wall of the body. The manifold may be formed from tubing that is plugged at its distal end and may include inlets machined into the tubing. The plurality of inlets may be provided by a porous material, such as open cell foam, mesh, or filter material, that is mounted on a frame.

In the following descriptions, reference is made to the accompanying drawings, in which are shown, by way of illustration, examples that can be practiced. It is to be understood that other examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain terminology is used in this description for convenience and reference only, and is not limiting. For example, the words "upwardly," "downwardly," "rightwardly," and "leftwardly" refer to directions in the drawings to which reference is made. The words "inwardly" and "outwardly" refer to directions toward and away from, respectively, the geometric center of the arrangement and designated parts thereof. The words "forwardly" and "distally" refer to the direction toward the end of the arrangement that is closest to the patient, and the words "rearwardly" and "proximally" refer to the direction toward the end of the arrangement which is furthest from the patient. This terminology includes the words specifically mentioned, derivatives thereof, and words of a similar nature.

A draping system for draping a medical device for use within a sterile field during a medical procedure may include a drape and a vacuum system for drawing a vacuum within the enclosed space created by the drape so that the drape conforms to the medical device. The vacuum system may include a vacuum manifold positioned within the drape along with the medical device. Vacuum is applied to the space enclosed by the drape for causing the drape to conform to the medical device. Vacuum can be applied to the enclosed space via the vacuum manifold for causing the drape to conform to the medical device, which can enhance graspability of the draped medical device and increase accessibility of any user controls on the medical device. The vacuum manifold can include a plurality of air inlets arranged to prevent complete blocking of all of the inlets by the drape so that the drape completely conforms to the medical device. The air inlets can be the pores of a porous material or can be perforations formed in an otherwise solid material.

Figure 1:
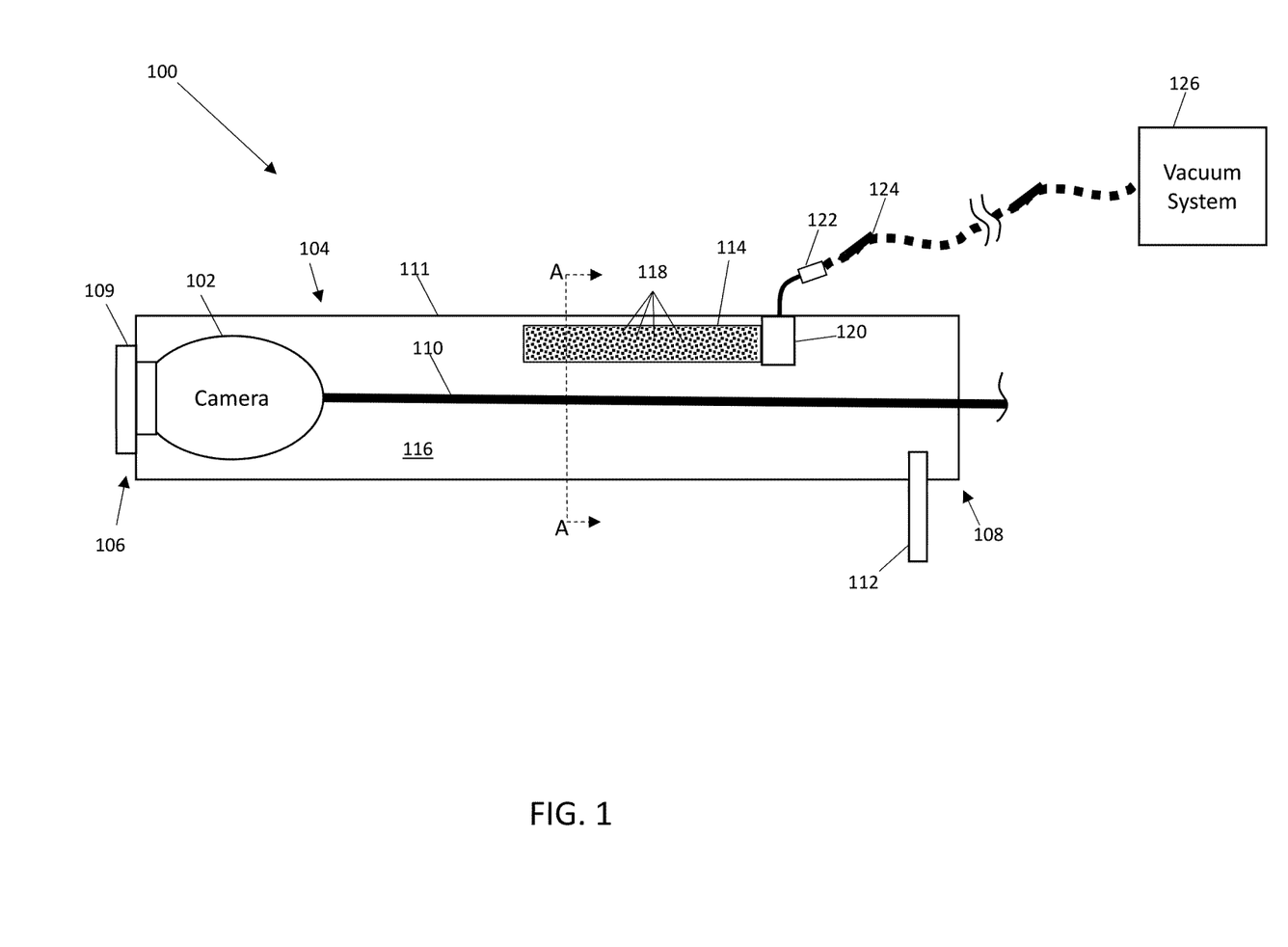
FIG. 1 illustrates an exemplary draping system that includes a vacuum manifold for enabling vacuum to be applied to the drape so that the drape conforms to a medical device while preventing the drape from blocking vacuum air flow.

FIG. 1 illustrates an example of a draping system 100 that includes a vacuum manifold for enabling vacuum to be applied to the drape so that the drape conforms to a medical device while preventing the drape from blocking vacuum air flow. The draping system 100 includes a drape 104 for draping a medical device 102. Medical device 102 may be used within a sterile field during a medical procedure, such as a surgical procedure. In the illustrated example, the medical device 102 is a camera head that either may not be designed for sterilizing or that a user may desire to use repeatedly without sterilizing (e.g., for using in back-to-back procedures). The drape 104 may be a sterile drape that is disposable or that can be re-sterilized for reuse.

The distal end 106 of the drape 104 may fit over a distal portion of the medical device 102 and the proximal end 108 of the drape 104 may be open for sliding the drape 104 over the medical device 102 and for any proximal portion of the medical device 102 or component(s) connected to the medical device 102 to extend out of. In the illustrated example, the drape 104 is sized to cover a portion of cables 110 (e.g., data cables, power cables, light cables) that are connected to the camera head, and the cables 110 extend outwardly from the proximal end 108 of the drape 104.

The distal end 106 of the drape 104 may be closed. The distal end 106 of the drape 104 may include an adapter 109 or other type of mounting feature for mounting to the medical device 102. A drape may be configured for draping a camera head and may include a lens mounted to the remainder of the drape for positioning in front of the imaging and/or light ports of the camera head. The lens can be a hard material (e.g., plastic or glass) component that allows the camera to image the scene with minimum distortion or unintentional wavelength filtering. The drape 104 includes a flexible drape material 111, such as a plastic material, that is shaped to envelope the medical device 102 and any connected components that may be positioned within the sterile field. The flexible drape material 111 is sufficiently flexible that it can conform to the medical device when vacuum is applied to the enclosed space within the drape 104. The flexible drape material may be tubular.

Figure 9:
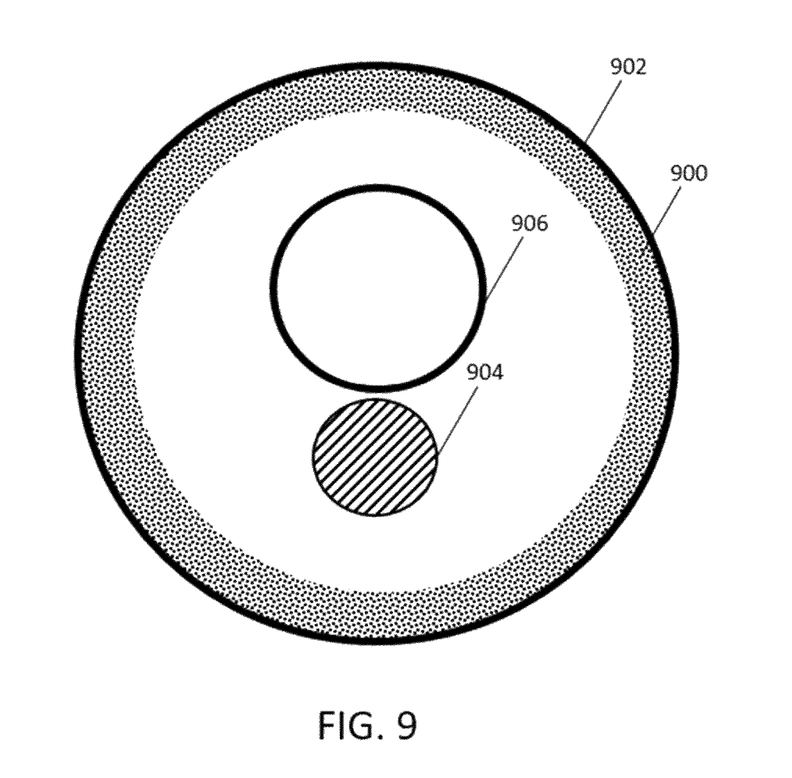
FIG. 9 illustrates the use of a sealing material at the cinch location of an exemplary drape system.

One or more cinches 112 may be used to secure the drape 104 to the medical device 100 and/or attached components to ensure that the drape 104 remains in place during the medical procedure. When the cinch(es) 112 are cinched, the drape 104 provides an enclosed space 116 within which the medical device 102 is positioned. In the illustrated example, the cinches 112 are cinched around the cable(s) 110 extending from the camera head. As explained in more detail below, cinching of the drape 104 to create the enclosed space 116 enables vacuum to be applied to the enclosed space 116 to conform to the medical device. A person having ordinary skill in the art will understand that the enclosed space may not be completely enclosed as there may still be air gaps, such as between the cables, that allow air to flow into the drape. As such, the skilled person will understand that the vacuum flow rate, e.g. the flow rate of the pump system, should be greater than the total combined leak rate. To reduce the leak rate, a sealing material can be applied to the inside surface of the end of the drape (such as a soft closed-cell foam or other similar material) that can conform to the gaps around the cables and provide a better seal. Such a material could be permanently applied as part of the drape or it could be provided to the surgical staff as a separate item that gets applied during the cinching process. This could permit a vacuum source to be used that does not provide a large flow rate. FIG. 9 illustrates an example of positioning a seal material 900 within the drape 902. The seal material 900 will conform to the cable(s) 904 and manifold 906 when the drape 902 is cinched and fill in gaps between and around the cable(s) 904 and/or manifold 906. The seal material 900 could be, for example, a ring or tube of closed-cell foam. The seal material 900 could be affixed (e.g., adhesively) to the inner surface of the drape 902, as illustrated in FIG. 9, or could be a separate component that the user positions around the cable(s) 904 and manifold 906 at the location(s) where the drape will be cinched. A separate seal material may be positioned around each cable and/or manifold to help fill the gaps between them.

In this example, a vacuum manifold 114 is positioned within the enclosed space 116 for creating a vacuum in the enclosed space 116. The vacuum manifold 114 includes a plurality of air flow inlets 118 for air within the enclosed space 116 to flow out of the enclosed space when vacuum is applied to the vacuum manifold 114. The inlets 118 are air-flow passageways that enable air to flow from the enclosed space 116 to the interior of the vacuum manifold 114 and out through the vacuum line 124. The inlets 118 can be pores in a porous structure, such as a foam or fabric material, or can be perforations formed in a non-porous material. Any suitable number of inlets may be provided, including on the order of tens, hundreds, or thousands of inlets. The vacuum manifold may be an elongated body that includes a plurality of air flow inlets 118 that extend along and/or around at least a portion of the body, such as a distal portion of the body. The arrangement of the plurality of inlets 118 is designed to prevent the flexible drape material 111 from blocking all of the inlets 118 when the drape material is pulled in by the vacuum applied via the vacuum manifold 114. While some portion of the inlets 118 may be blocked by the flexible drape material 111, a sufficient number of them may remain unblocked such that air can continue to flow out of the enclosed space around the medical device 102.

Figure 2:
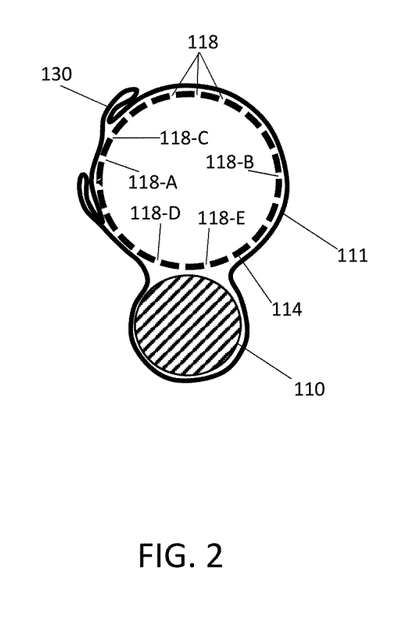
FIG. 2 illustrates an exemplary manner in which the arrangement of the plurality of inlets prevents the flexible drape material from blocking all of the inlets when vacuum is applied.

FIG. 2 illustrates an exemplary manner in which the arrangement of the plurality of inlets 118 prevents the flexible drape material 111 from blocking all of the inlets 118 when vacuum is applied. FIG. 2 is a cross sectional view through line A-A of FIG. 1 in the condition in which vacuum has been applied and the flexible drape material 111 is drawn around the vacuum manifold 114 and cable 110. In the illustrated example, the inlets 118 extend around the entire circumference of the vacuum manifold 114. The flexible drape material 111 is blocking many of the inlets 118, such as inlets 118-A and 118-B. However, inlet 118-C is positioned in line with a fold 130 in the flexible material 111 that leaves the inlet 118-C uncovered. Further, inlets 118-D and 118-E are positioned near the cable 110 which prevents the flexible drape material 111 from covering the inlets 118-D and 118-E.

Returning to FIG. 1, the vacuum manifold 114 may include or be connected to a connector 120 mounted to the drape 104. A port 122 may be provided for connecting a vacuum line 124 to the connector 120. The port may include a one-way valve to prevent air from entering the enclosed space 116. The vacuum line 124 may be connected to a vacuum system 126, which can be a standalone vacuum generator or room vacuum. The vacuum manifold 114 and connector 120 may be portions of the same component or may be separate components. Similarly, the port 122 may be integrated into the connector 120 or may be a separate component connected to the connector 120.

Figure 3A:
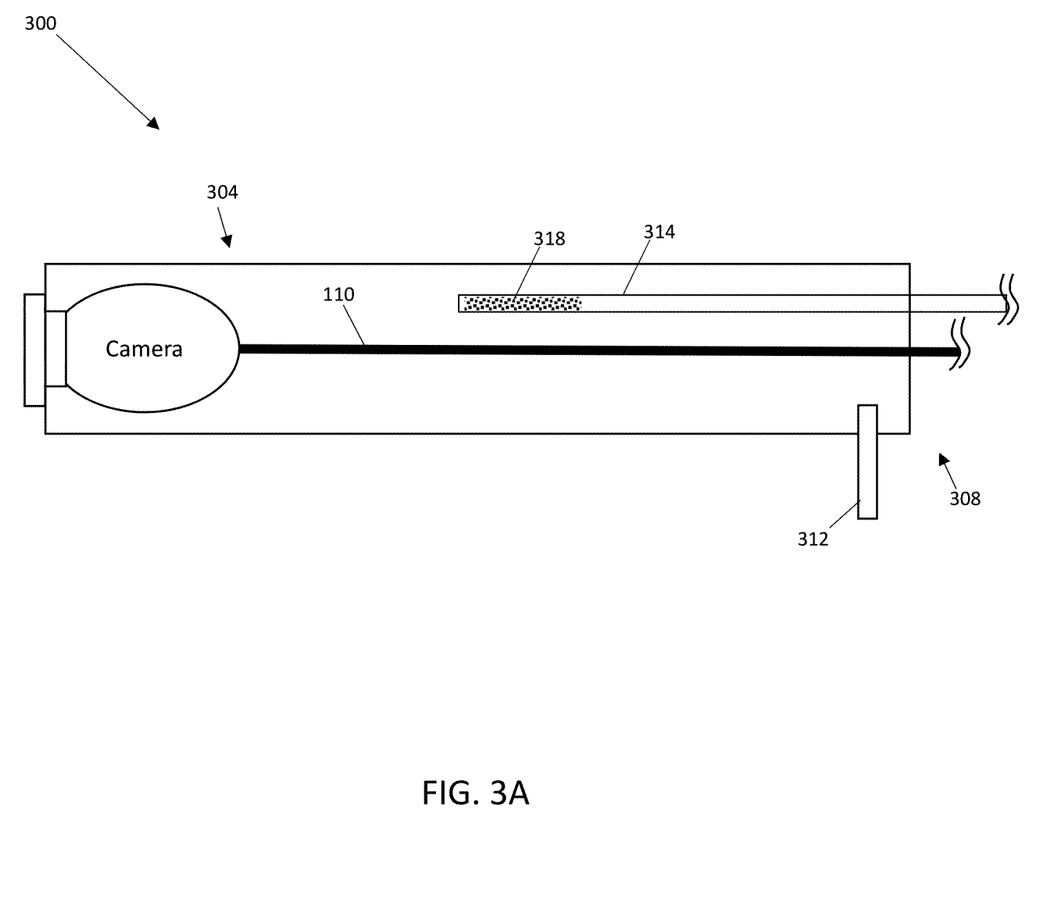
FIG. 3A illustrates an exemplary configuration of a drape system.
Figure 3B:
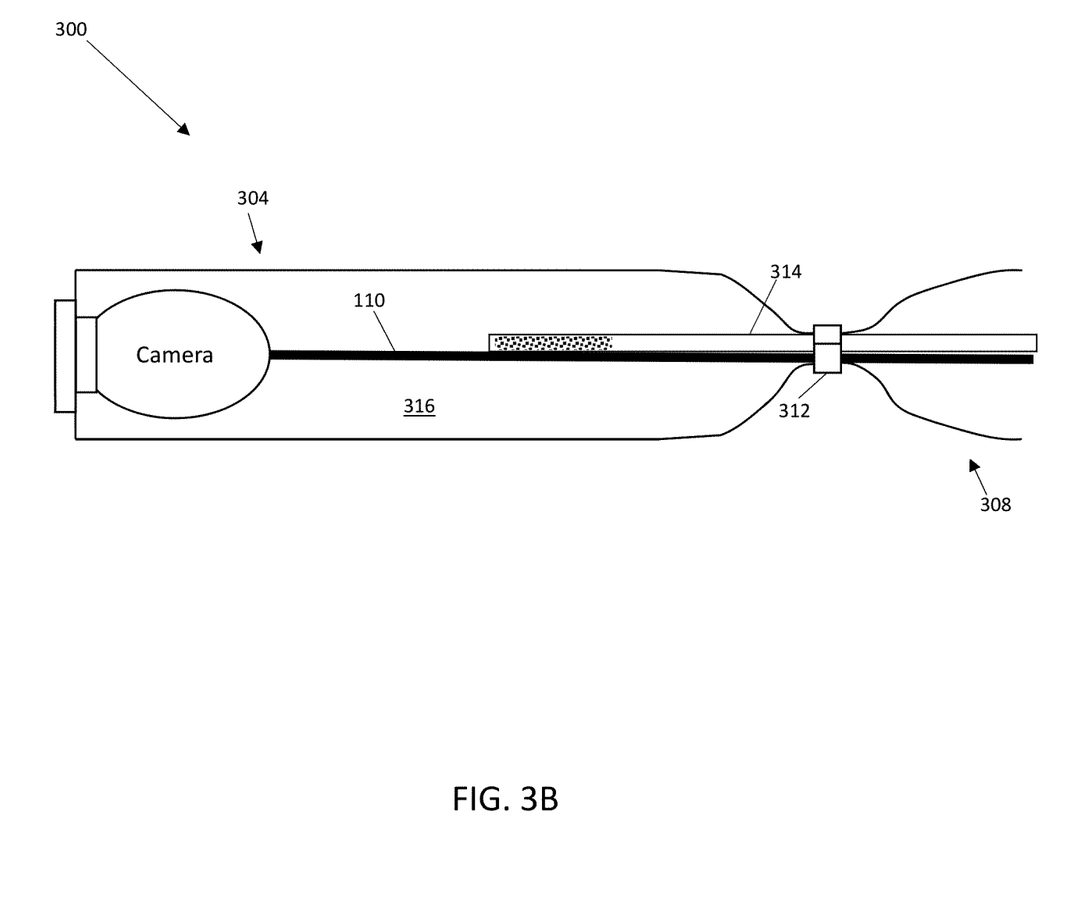
FIG. 3B illustrates the drape system of FIG. 3A in a cinched configuration.

FIG. 3A illustrates another exemplary configuration of a drape system. Drape system 300 includes a vacuum manifold 314 that is separate from the drape 304. The vacuum manifold 314 is inserted through the proximal end 308 of the drape 304. The strap 312 can be cinched around the vacuum manifold 314 at a location that is proximal of the plurality of air flow inlets 318 or around a vacuum line that is connected to the vacuum manifold 314. Compared to the example illustrated in FIG. 1, the exemplary configuration illustrated in FIG. 3A can be used with pre-existing drapes without any drape modifications required. Further, the vacuum manifold 314 could be used with multiple different configurations of drapes and/or could be reusable. FIG. 3B illustrates the drape system 300 in the cinched configuration in which the strap 312 is cinched around the drape 304, vacuum manifold 314 and cable(s) 110, forming the enclosed space 316.

Figure 4:
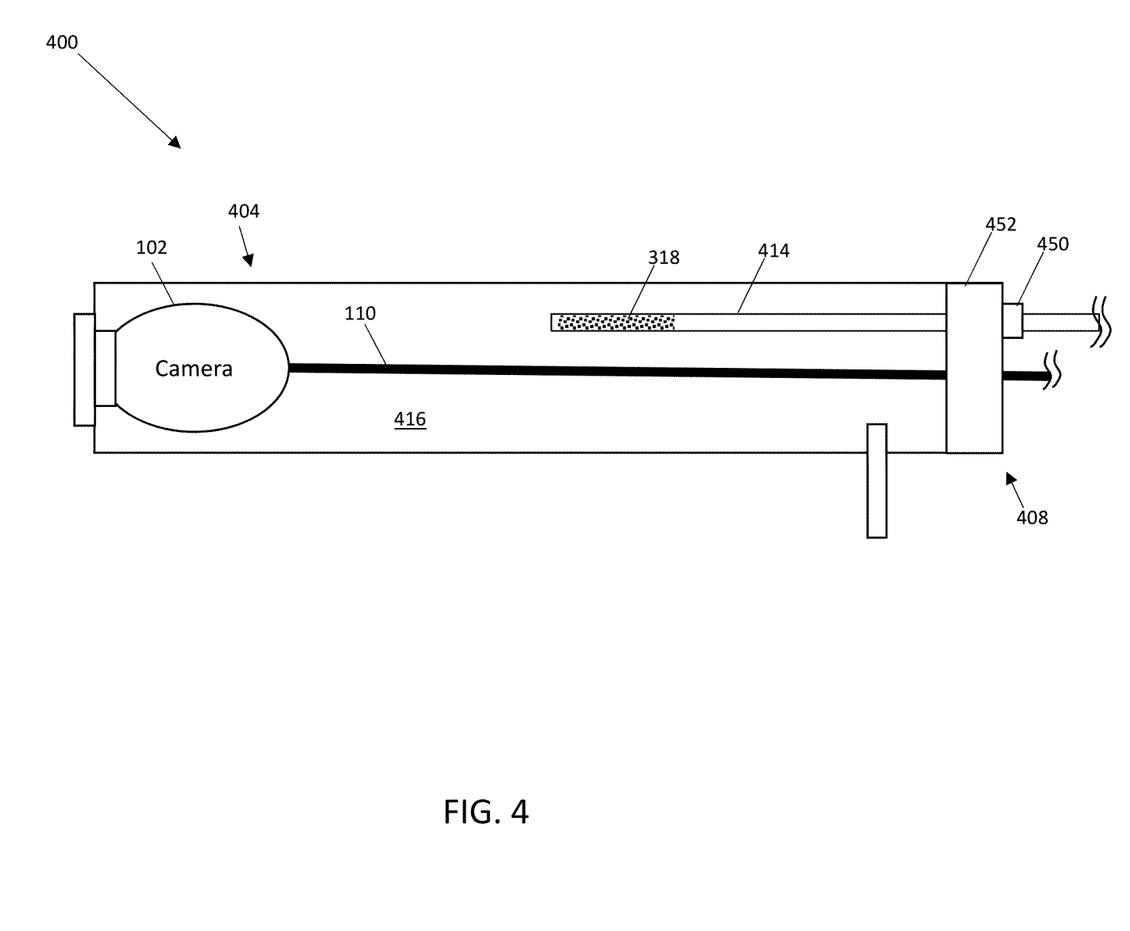
FIG. 4 illustrates an exemplary configuration of a drape system.

FIG. 4 illustrates another configuration of a drape system. Similar to system 300 of FIG. 3, system 400 of FIG. 4 includes a vacuum manifold 414 that is inserted into the enclosed space 416 through the proximal end 408 of the drape 404. However, unlike system 300 of FIG. 3, the drape 404 includes a receiver 450 at the proximal end 408 for receiving the vacuum manifold 414. The user may insert the vacuum manifold 414 through the receiver 450 after the drape 404 has been positioned over the medical device 102. The receiver 450 may be integrated into a proximal portion 452 of the drape 404 that may be made of a different material than the flexible drape material, such as for enhancing strength of the proximal end 408 and/or for facilitating folding of the drape 404 for packaging and/or storage.

The vacuum manifold may be integrated with the drape as an assembled unit. The vacuum manifold may be a separate component from the drape and may be user-mounted to the drape before or after positioning the drape on the medical device or may be user-positioned within the drape after the drape is positioned on the medical device. The vacuum manifold and drape may be provided as a kit. The vacuum manifold and drape may be sterilized by the manufacturer and provided to the user in sealed packaging. The vacuum manifold may be sterilizable and reusable. The drape may be disposable and may be provided with a port for affixing a sterilizable and reusable vacuum manifold and for attaching a vacuum line. The vacuum manifold may be disposable.

Figure 5A:
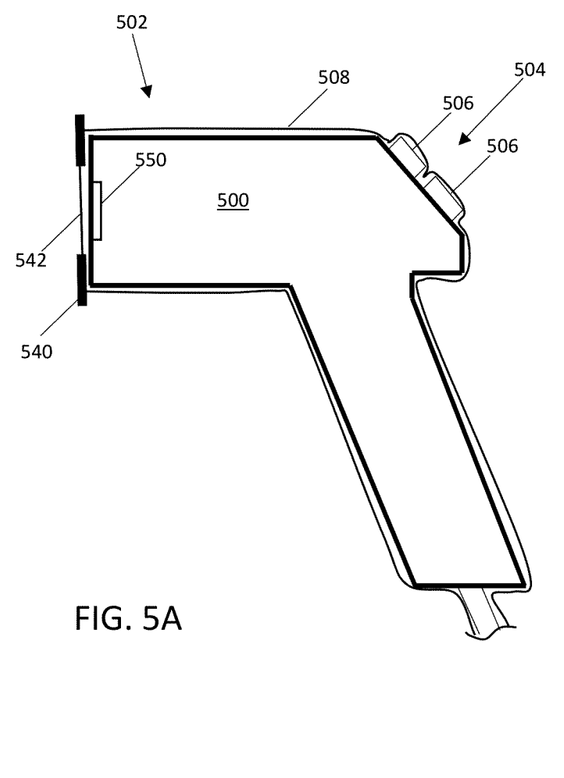
FIG. 5A illustrates an example of a camera head covered by a drape that conforms to the shape of the camera head due to vacuum applied via a vacuum manifold.

FIG. 5A illustrates a camera head 500 covered by a drape 502 that conforms to the shape of the camera head 500 due to vacuum applied via a vacuum manifold, such as any of the vacuum manifolds discussed above. The camera head 500 includes a user interface 504 that includes a number of buttons 506. As illustrated, the flexible drape material 508 of the drape 502 has conformed to the buttons 506 such that the buttons 506 are easily accessible to the user. Conforming of the flexible drape material to the buttons can enable the perception of tactile indicators that may be provided on the buttons 506 (or other interface) that would otherwise be difficult to perceive when covered with a loose drape. The flexible drape material 508 may be made of a transparent or semi-transparent material such that when the flexible drape material 508 conforms to the buttons 506, visual indicators of the buttons 506 (e.g., labels) may be visible to the user. A user interface 504 may include a screen that may be visible when the flexible drape material 508 conforms to the user interface 504. The user interface 504 may include a touch screen or other touch-sensitive surface that is more easily used due to the flexible drape material conforming to the touch-sensitive surface. The flexible drape material 508 may be configured to allow operation of the touch screen covered by the flexible drape material. The drape 502 may include an adapter 540 that is configured for affixing the drape to the camera head 500. A lens 542 is mounted to the adapter 540 and is positioned for covering the imaging port(s) 550 of the camera head.

Figure 5B:
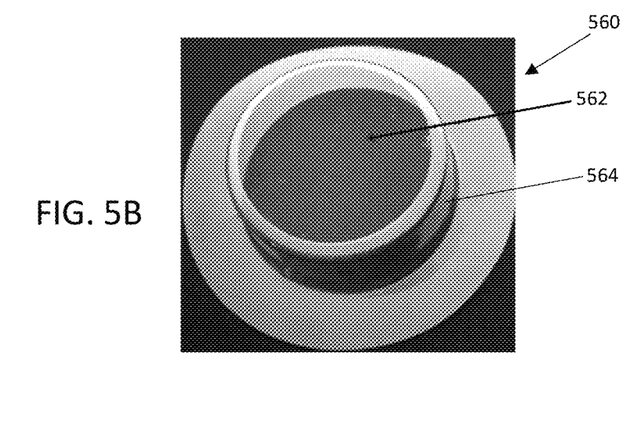
FIGS. 5B-5D illustrate an example of a drape for an endoscopic camera that includes a lens that has an adapter portion for positioning the lens in the optical pathway of the camera head.
Figure 5C:
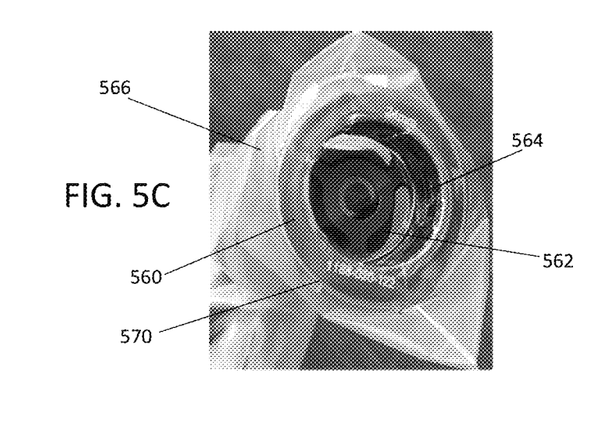
Figure 5D:
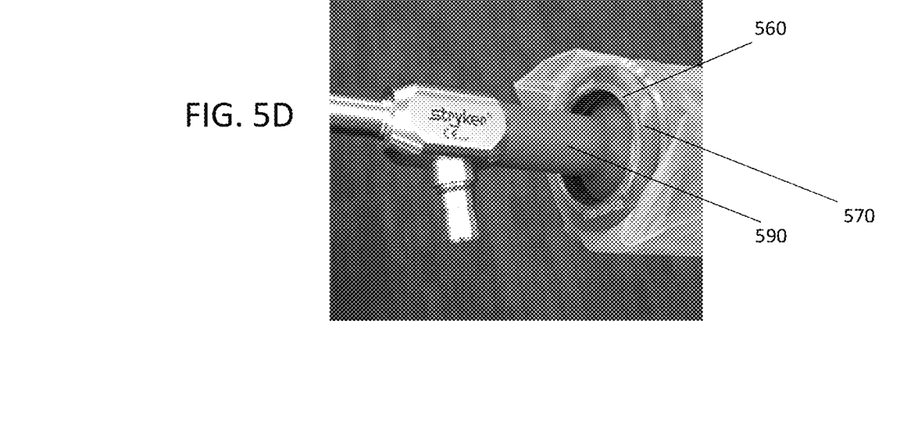

The lens may include an adapter portion that mates with the camera head to position in the lens in the proper location. The flexible drape material may be directly bonded, or otherwise affixed, to the adapter portion of the lens. FIGS. 5B-5D illustrate an example of a drape for an endoscopic camera that includes a lens that has an adapter portion for positioning the lens in the optical pathway of the camera head. FIG. 5B illustrates the lens 560, which includes a lens portion 562 and adapter portion 564. The flexible drape material can be bonded to the adapter portion 564 such that an air-tight seal is formed. FIG. 5C shows the lens 560 positioned on a camera coupler 570 of an endoscopic camera head. The flexible drape material 566 is bonded to the adapter portion 564. The adapter portion 564 fits within the camera coupler 570 such that the lens portion 562 is positioned directly in front of the optical pathway of the camera head. The lens may have a positive lens power, negative lens power or zero lens power. The lens may be a thin and flexible lens that is thick enough, stiff enough, and flat enough to not cause image distortion from the imaging device but is also flexible enough that it can fit inside the camera coupler and still allow the grasping features of the camera coupler to reliably attach to the eyepiece of an endoscope/laparoscope. FIG. 5D illustrates the scope 590 positioned in the camera coupler 570 over the lens 560. A coating may be applied to the lens to make it optically invisible to the camera. By integrating a lens with the drape material, the user can quickly and simply swap out different scopes during the course of a surgery without having to discard the drape and put on a new drape.

Figure 6:
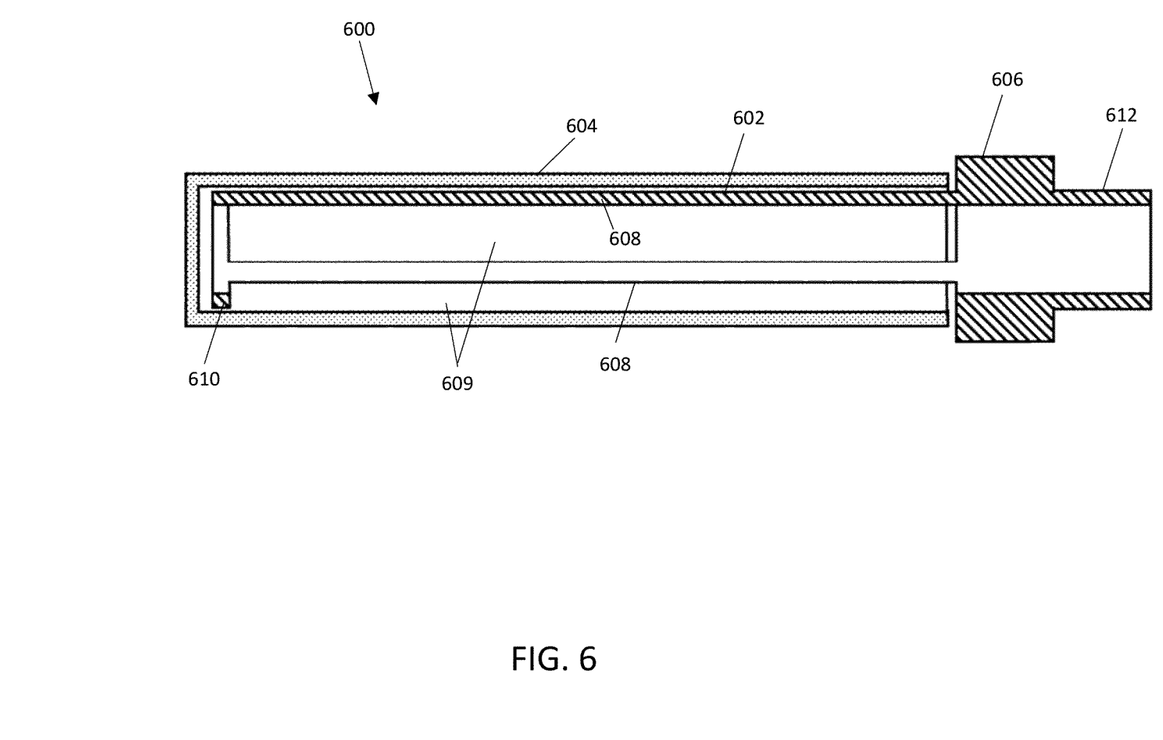
FIG. 6 is a cross section of an exemplary vacuum manifold that includes a frame covered by a porous material.

The vacuum manifold in any of the examples described above or any other examples may be formed in a number of ways. The vacuum manifold may be formed of a length of tubing in which a plurality of holes have been formed to serve as the vacuum air flow inlets and optionally with the distal end plugged. The vacuum manifold may comprise a portion of rigid or semi-rigid porous material, such as a rigid or semi-rigid open cell foamed structure, e.g. comprising a polymeric, carbon, metal and/or ceramic open cell foam. The manifold may comprise a 3D-printed portion comprising a plurality of holes and/or pores. The portion of rigid or semi-rigid porous material may be 3D-printed. The vacuum manifold may be formed of a rigid or semi-rigid frame covered by a porous material in which the pores serve as the vacuum air flow inlets. The flexible material may be an open cell foam, which may be in a tubular shape and may slide over a tubular frame. The flexible material may be a fabric material, such as formed of one or more layers of interlinked or overlapping fibers. The porous material may be a tube of sheet metal or other rigid material that has a plurality of perforations formed therein. FIG. 6 is a cross section of an exemplary vacuum manifold 600 that includes a frame 602 covered by a porous material 604. The frame 602 includes a main body 606 and a plurality of ribs 608 extending in the longitudinal direction from the main body 606 to an annular end piece 610. The space 609 between the ribs 608 is open to permit air flow into the central portion of the frame 602. A connector 612 may be located at the proximal end of the vacuum manifold 600 for attaching a vacuum line or attaching the vacuum manifold 600 to a coupling or connector mounted to the drape.

Figure 7:
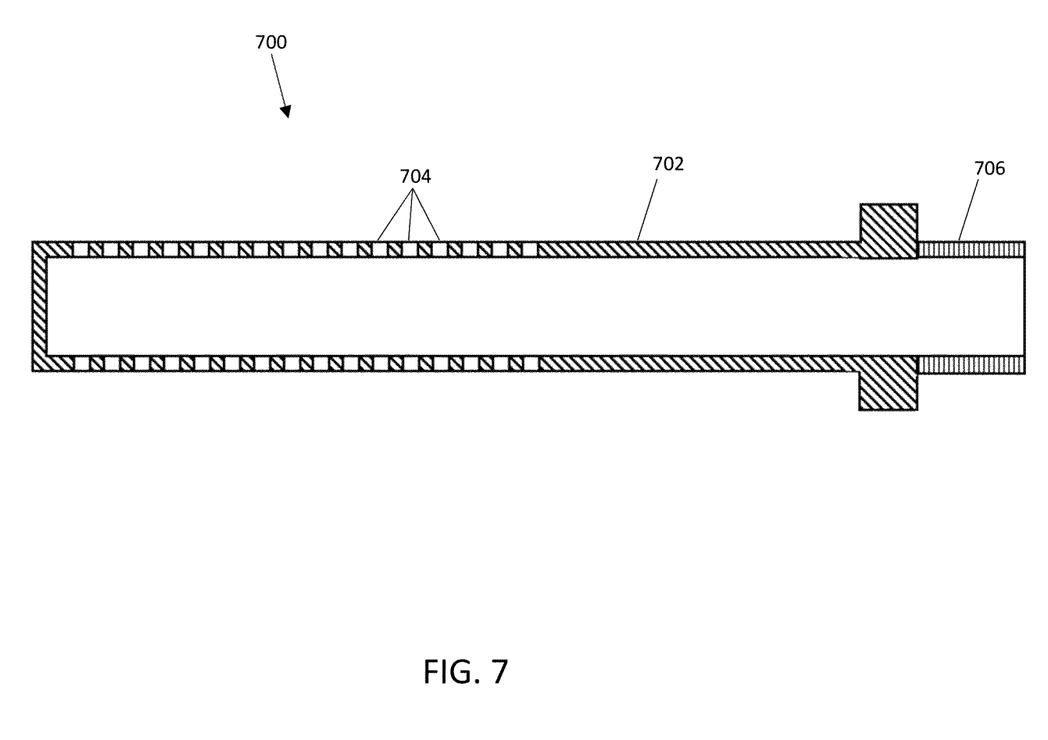
FIG. 7 illustrates an example of a vacuum manifold formed of a rigid body that includes a plurality of perforations formed in the body.

The vacuum manifold may be a solid-walled body, which can be rigid (e.g. metal), semi-rigid (e.g., thin-walled PVC, or flexible (e.g., tubing), that may have perforations formed along and around its outer surface. For example, the body may be formed of an injection molded or extruded plastic in which perforations have been molded or machined, or the body may be formed of a metal tube in which perforations have been machined, stamped, or otherwise formed or created in the tube. FIG. 7 illustrates an example of a vacuum manifold 700 formed of a rigid body 702 that includes a plurality of perforations 704 formed in the body 702, which may be tubular in shape. The plurality of perforations 704 may extend along the entire length of the body 702 or along just a portion of the body 702 as illustrated. The plurality of perforations 704 may extend around the entire cross-sectional perimeter of the body 702 (e.g., around the entire circumference of a cylindrical body) or around only a portion of the perimeter. A connector 706 may be located at the proximal end of the vacuum manifold 700 for attaching a vacuum line or attaching the vacuum manifold 700 to a coupling mounted to the drape.

A perforated solid-walled body, such as body 702 of FIG. 7, may be covered with a porous material, such as porous material 604 of FIG. 6.

Figure 8:
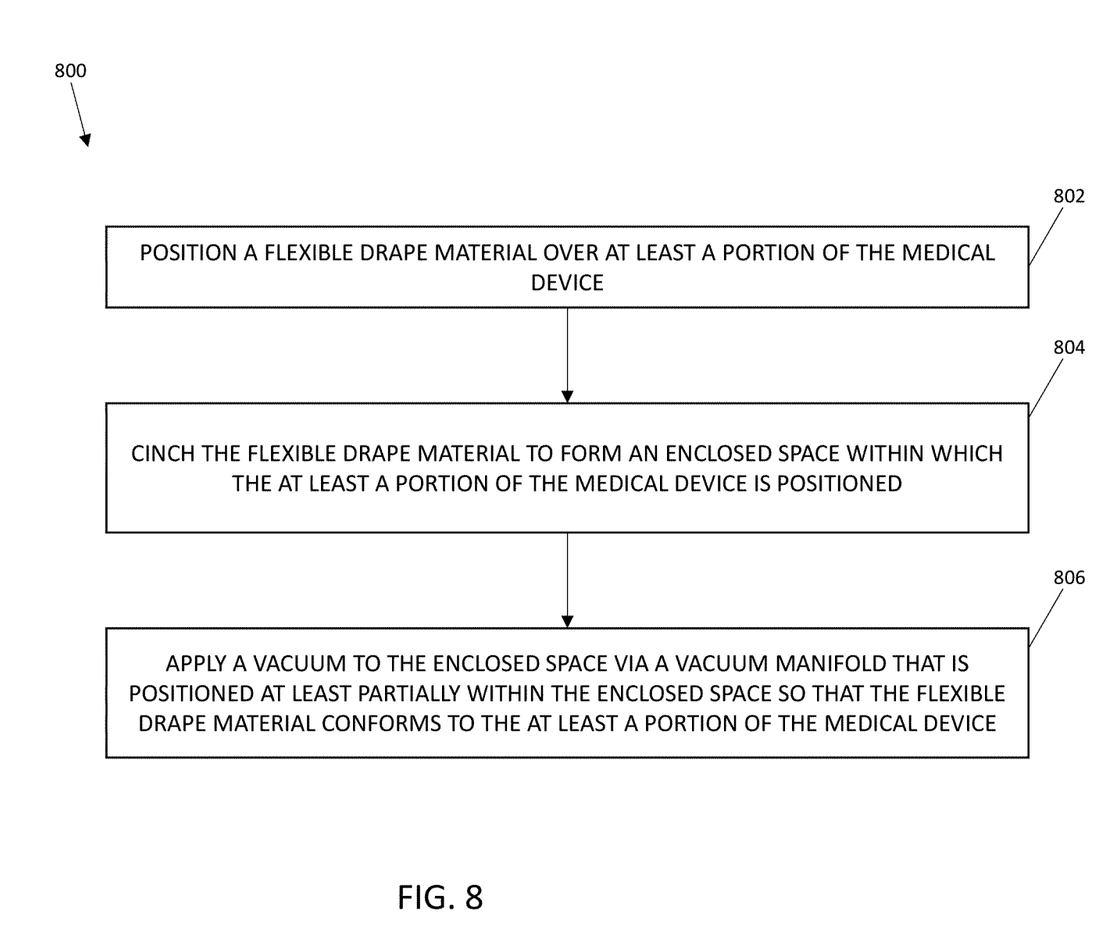
FIG. 8 is a block diagram of an exemplary method for draping a medical device for use during a medical procedure, such as within a sterile field during a surgical procedure.

FIG. 8 is a block diagram of an exemplary method 800 for draping a medical device for use during a medical procedure, such as within a sterile field during a surgical procedure. At step 802 a flexible drape material of a drape is positioned over at least a portion of a medical device. The drape can be, for example, drape 104 of FIG. 1. The medical device can be a device that is not sterilizable or can be a sterilizable device that a user wishes to use without sterilizing, such as in back-to-back procedures where there is insufficient time to sterilize the device. The medical device could be, for example, a camera head, such as an endoscopic camera head or a hand-held open-field camera head. The drape may be a sterilized drape that is removed from sealed packaging and placed over the medical device. The drape may include an adapter for mounting the drape to the medical device. The adapter can be a rigid component that is configured to engage with one or more features of the medical device. The drape may be configured for draping a camera head and the adapter may mount a lens that is positioned in the light pathway of the camera head so that the entire medical device is covered while minimizing any degradation of the imaging performance of the camera head.

At step 804, the flexible drape material is cinched to form an enclosed space within which the at least a portion of the medical device is positioned. The flexible drape material can be cinched using a cinch such as a Velcro™ strap, an elastic band, a tie, tape, or any other suitable component that can be used to tighten the drape material to form an enclosed space. As used herein, "cinched" means tightened using any suitable means and encompasses the use of a self-cinching component, such as an elastic band, and wrapping one or multiple turns of a strap, string, line, tape, etc., and/or tying of a strap, string, line, etc. An elastic band may be a built-in component of the drape and the medical device may be inserted by expanding the elastic band and the cinching of the drape material occurs automatically (i.e., step 804 occurs as the user pulls the drape with elastic band over the medical device). The cinch may include an adhesive to ensure that the cinch remains in place. The cinch may cinch the flexible drape material around cables extending from the medical device, such as one or more power cables, one or more data cables, and/or one or more light cables. The cinch may cinch only the flexible drape material. The flexible drape material may be cinched in one location or the flexible drape material may be cinched in multiple locations. Cinching of the flexible drape material creates a degree of air sealing such that a vacuum can be created within the enclosed space that is distal of the cinch (or of the distal-most cinch).

At step 806, vacuum is applied to the enclosed space via a vacuum manifold that is positioned at least partially within the enclosed space so that the flexible drape material conforms to the at least a portion of the medical device. The vacuum manifold can be, for example, any of vacuum manifolds 114, 314, 414, 600, or 700 discussed above. As discussed in more detail above, the vacuum manifold includes a plurality of vacuum air flow inlets that are arranged to ensure that at least a portion of the inlets remain open when the flexible drape material is drawn against the vacuum manifold when vacuum is applied. The vacuum manifold may extend in a longitudinal direction of one or more cables extending from the medical device. The positioning of the vacuum manifold alongside the one or more cables may help in ensuring that at least a portion of the vacuum air inlets of the vacuum manifold remain open when vacuum is applied to the enclosed space. The vacuum manifold may be integrated into the drape such that the vacuum manifold is in position when the drape is placed on the medical device. The drape and the vacuum manifold may be separate components and the vacuum manifold may be positioned after the drape is placed on the medical device, such as by inserting the vacuum manifold through a proximal end of the drape or other portion of the drape. The cinch may be cinched around the vacuum manifold (proximally of its vacuum air inlets), around a vacuum line connected to the vacuum manifold, or in embodiments in which the vacuum connected is in the side of the drape (see, e.g., drape 104 of FIG. 1), the cinch may be positioned proximally of the vacuum manifold. Vacuum may be applied continuously while the medical device is being used in the sterile field so that any air that can enter the enclosed space within the drape (such as through the cinched proximal portion of the drape) is pulled out.

An exemplary method for draping of a medical device according to the principles discussed above may include a user outside the sterile field (OSF) holding the unsterile medical device (e.g., camera head) and the user inside the sterile field (ISF) holding the drape. The OSF user can insert the medical device into the drape without touching the outside of the drape. The ISF user will mount the proximal end of the drape to the medical device and will extend the drape (e.g., unroll or unfold the drape). Once the vacuum port is exposed, the ISF user will attach the vacuum flexible tubing to the vacuum port and pass it to the OSF user without touching the OSF user. While the ISF user holds the medical device in place, the OSF will connect the vacuum tubing (e.g. flexible tubing) to the vacuum source and will seal the proximal end of the drape with the cinch. The OSF user will turn on the vacuum source, and within seconds or faster the drape will conform to the medical device.

As explained above, applying vacuum to the enclosed space causes the flexible drape material to conform to the medical device, which can enhance manipulability of the medical device compared to a loose draping. Further, the medical device may include a user interface, which may be more observable and accessible with the flexible drape material conformed it than with the drape material loose.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A drape for a medical camera, the drape comprising:
a flexible drape material for covering at least a portion of the medical camera and configured to be cinched in at least one location along the flexible drape material to form an enclosed space for enclosing the at least a portion of the medical camera;
a vacuum manifold that, when the flexible drape material is cinched, is positioned at least partially within the enclosed space for creating a vacuum in the enclosed space to cause the flexible drape material to conform to the at least a portion of the medical camera when the at least a portion of the medical camera is positioned within the enclosed space, and
an adapter for mounting to the medical camera, wherein the adapter is affixed to the drape material.

2. The drape of claim 1, comprising a connector mounted to the flexible drape material, wherein the vacuum manifold is connected to the connector.

3. The drape of claim 1, comprising at least one cinch for cinching the flexible drape material.

4. The drape of claim 3, wherein the at least one cinch comprises an elastic band, a tie, or tape.

5. The drape of claim 3, wherein the at least one cinch is configured for cinching the flexible drape material to one or more cables extending from the medical camera.

6. The drape of claim 1, wherein, when the flexible drape material is cinched and the vacuum manifold is positioned within the enclosed space, the flexible drape material is cinched around the vacuum manifold.

7. The drape of claim 1, wherein a proximal portion of the drape comprises a port through which the vacuum manifold extends.

8. The drape of claim 7, wherein the port is mounted on the flexible drape material.

9. The drape of claim 1, wherein the vacuum manifold comprises a perforated outer surface.

10. The drape of claim 1, wherein the vacuum manifold comprises a porous flexible material.

11. The drape of claim 1, wherein the vacuum manifold is sterilizable and reusable.

12. The drape of claim 1, comprising a lens for positioning in front of an imaging port of the medical camera.

13. A kit comprising the drape of claim 1 in a sterilized package.

14. The drape of claim 1, wherein the drape is disposable.

15. A method of draping a medical camera comprising:
mounting an adapter of a drape to the medical camera, wherein the adapter is affixed to the flexible drape material;
positioning a flexible drape material of the drape over at least a portion of the medical camera;
cinching the flexible drape material to form an enclosed space within which the at least a portion of the medical camera is positioned; and
applying a vacuum to the enclosed space via a vacuum manifold that is positioned at least partially within the enclosed space so that the flexible drape material conforms to the at least a portion of the medical camera.

16. The method of claim 15, wherein the medical camera is an endoscopic camera or an open-field camera.

17. The method of claim 15, wherein the medical camera comprises a user interface and the flexible drape material conforms to the user interface.

18. The method of claim 15, wherein the vacuum manifold comprises a plurality of perforations.

19. The method of claim 18, comprising, after positioning the flexible drape material over the at least a portion of the medical camera and prior to cinching the flexible drape material, inserting the vacuum manifold, wherein the flexible drape material is cinched around the vacuum manifold.

20. The method of claim 15, wherein the vacuum manifold is inserted through a port in a proximal portion of the drape.

21. The method of claim 15, wherein the vacuum manifold is mounted to the flexible drape material.

22. The method of claim 15, further comprising positioning a sealing material where the flexible drape material is cinched.

23. The method of claim 15, wherein the drape comprises a lens for positioning in front of an imaging port of the medical camera.

24. The method of claim 15, wherein the flexible drape material is cinched around one or more cables extending from the medical camera.

25. The method of claim 24, wherein the vacuum manifold is elongate and a length of the vacuum manifold extends in a longitudinal direction of the one or more cables.

* * * * *